United States Patent
Yamada

(10) Patent No.: US 9,310,973 B2
(45) Date of Patent: Apr. 12, 2016

(54) ADAPTIVE USER INTERFACE FOR IMAGE PROCESSING APPARATUS

(71) Applicant: Kazutaka Yamada, Nagakute (JP)

(72) Inventor: Kazutaka Yamada, Nagakute (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 170 days.

(21) Appl. No.: 13/938,602

(22) Filed: Jul. 10, 2013

(65) Prior Publication Data

US 2014/0033090 A1  Jan. 30, 2014

(30) Foreign Application Priority Data

Jul. 30, 2012  (JP) ................................. 2012-168196

(51) Int. Cl.
*G06F 3/0484* (2013.01)
*G06F 3/12* (2006.01)

(52) U.S. Cl.
CPC ............ *G06F 3/0484* (2013.01); *G06F 3/1204* (2013.01); *G06F 3/1222* (2013.01); *G06F 3/1238* (2013.01); *G06F 3/1258* (2013.01); *G06F 3/1267* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 5,077,795 A * | 12/1991 | Rourke et al. | 380/55 |
| 2003/0152231 A1* | 8/2003 | Tomita | G07C 9/00103 380/258 |
| 2004/0184072 A1* | 9/2004 | Jacobsen et al. | 358/1.15 |
| 2005/0100378 A1* | 5/2005 | Kimura et al. | 400/76 |
| 2007/0050722 A1* | 3/2007 | Schulz et al. | 715/764 |
| 2007/0206216 A1* | 9/2007 | Sakagami et al. | 358/1.15 |
| 2011/0075188 A1* | 3/2011 | Yajima | 358/1.14 |
| 2012/0080519 A1* | 4/2012 | Kim | 235/380 |
| 2012/0250068 A1* | 10/2012 | Yamamoto et al. | 358/1.14 |
| 2013/0278960 A1* | 10/2013 | Nishiyama | 358/1.14 |

FOREIGN PATENT DOCUMENTS

| JP | 2010146353 A | 7/2010 |
|---|---|---|
| JP | 2011128907 A | 6/2011 |

* cited by examiner

*Primary Examiner* — William Bashore
*Assistant Examiner* — Daniel Parcher
(74) *Attorney, Agent, or Firm* — Scully, Scott, Murphy & Presser, PC

(57) ABSTRACT

An image processer executes image processing. An interface unit provides a user interface which receives an operation relating to the image processing from users. A receiver receives user information by an input method selected by the user among a plurality of input methods that are different from each other. A controller executes, when the receiver receives an input of the user information, making at least one of a first determination of whether the user interface is to be provided and a second determination of which one of a plurality of user interfaces is to be provided, depending on the input method when the receiver receives the user information. The controller executes controlling the interface unit according to one of a result of the first determination and a result of the second determination.

15 Claims, 12 Drawing Sheets

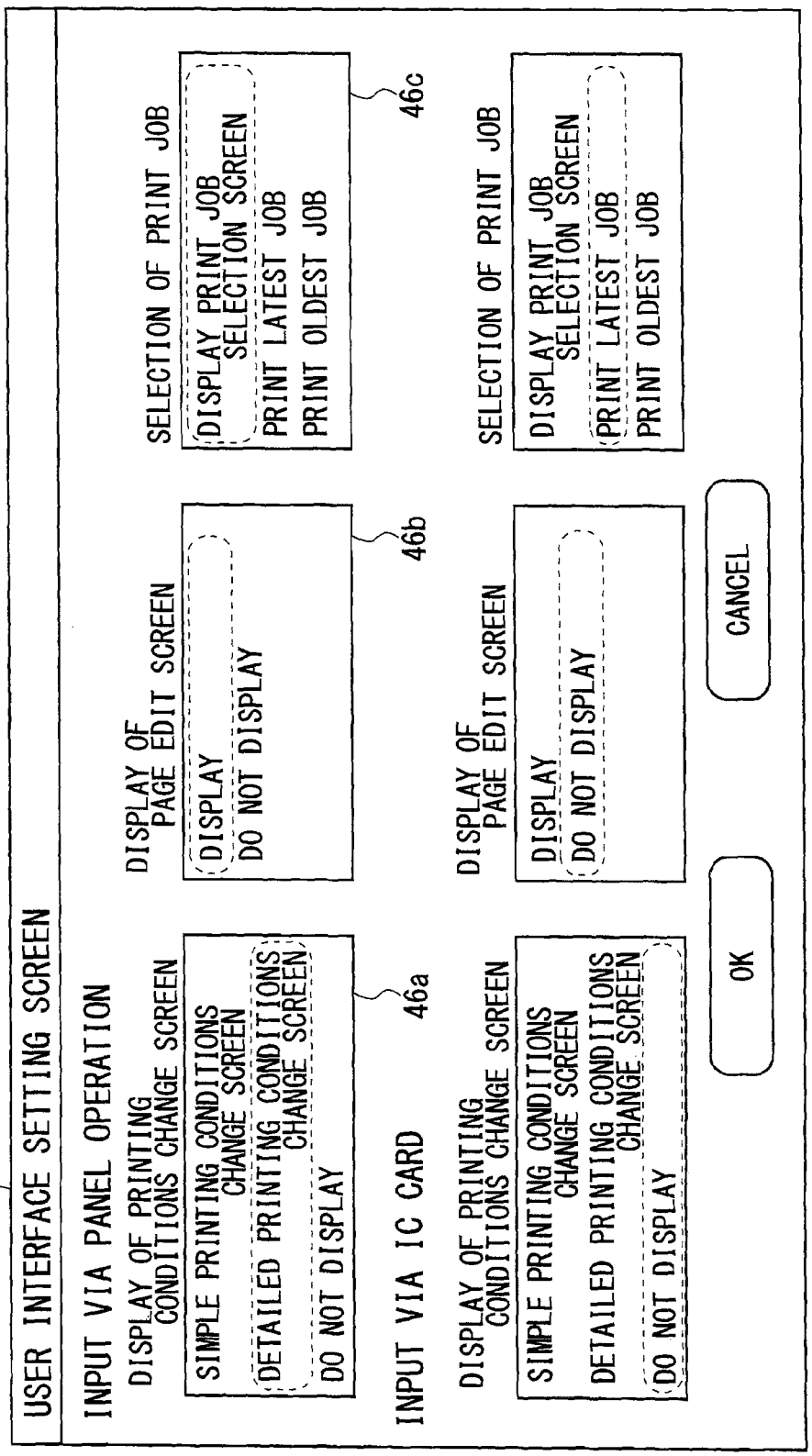

ADAPTIVE USER INTERFACE FOR IMAGE PROCESSING APPARATUS

CROSS REFERENCE TO RELATED APPLICATIONS

This application claims priority from Japanese Patent Application No. 2012-168196 filed Jul. 30, 2012. The entire content of the priority application is incorporated herein by reference.

TECHNICAL FIELD

The present invention relates to a technology for providing a user interface which receives an operation relating to image processing job from a user.

BACKGROUND

The technology of requesting authentication of a user in the use of an image processing apparatus and permitting the user who succeeded in the authentication to use the image processing apparatus has heretofore been known. For example, there has been known an image forming apparatus which is provided with a first authentication mode using a storage medium and a second authentication mode using user information inputted via an operation by a user and gives permission for the use thereof when the user is authenticated by either one of the authentication modes.

SUMMARY

When the user information is inputted, a user interface which receives an operation relating to image processing is provided in some cases so that the image processing is executed based on settings which are received by the user interface.

However, it depends on a user whether the provided user interface meets the needs of the user, and it has been difficult to provide a user interface which simultaneously meets the needs of all users.

For instance, it has been difficult to simultaneously satisfy the needs of the user who desires a more simple operation with a reduced number of items to be set and the needs of the user who desires to set more items even if the operation is complicated.

In view of the foregoing, the present specification discloses a technology providing a user interface which better meets the needs of a user.

In order to attain the above and other objects, the invention provides an image processing apparatus. The image processing apparatus includes an image processer, an interface unit, a receiver, and a controller. The image processer is configured to execute image processing. The interface unit is configured to provide a user interface which receives an operation relating to the image processing from a user. The receiver is configured to receive user information by an input method selected by the user among a plurality of input methods that are different from each other. The controller is configured to execute, when the receiver receives an input of the user information, making at least one of a first determination of whether the user interface is to be provided and a second determination of which one of a plurality of user interfaces is to be provided, depending on the input method when the receiver receives the user information. The controller is also config-ured to execute controlling the interface unit according to one of a result of the first determination and a result of the second determination.

According to another aspect, the invention also provides a storage medium storing a set of program instructions. When executed by a processor of an information processing apparatus capable of communicating with an image processing apparatus, the set of program instructions causes the information processing apparatus to execute: receiving setting of an input method for inputting user information to the image processing apparatus; adding the received setting of the input method to an image to be processed by the image processing apparatus; and transmitting the image added to the received setting of the input method to the image processing apparatus.

The technology disclosed in the present specification can be realized in various aspects such as an image processing system, an image processing method, information processing apparatus, a storage medium storing an image processing control program, and the like.

BRIEF DESCRIPTION OF THE DRAWINGS

Embodiments in accordance with the invention will be described in detail with reference to the following figures wherein:

FIG. 13 is a screen shot showing a user interface setting screen according to Embodiment 3.

DETAILED DESCRIPTION

<Embodiment 1>

Embodiment 1 of the present invention will be described with reference to FIG. 1 to FIG. 9.

(1) Electric Configuration of Printer

Figure 1:
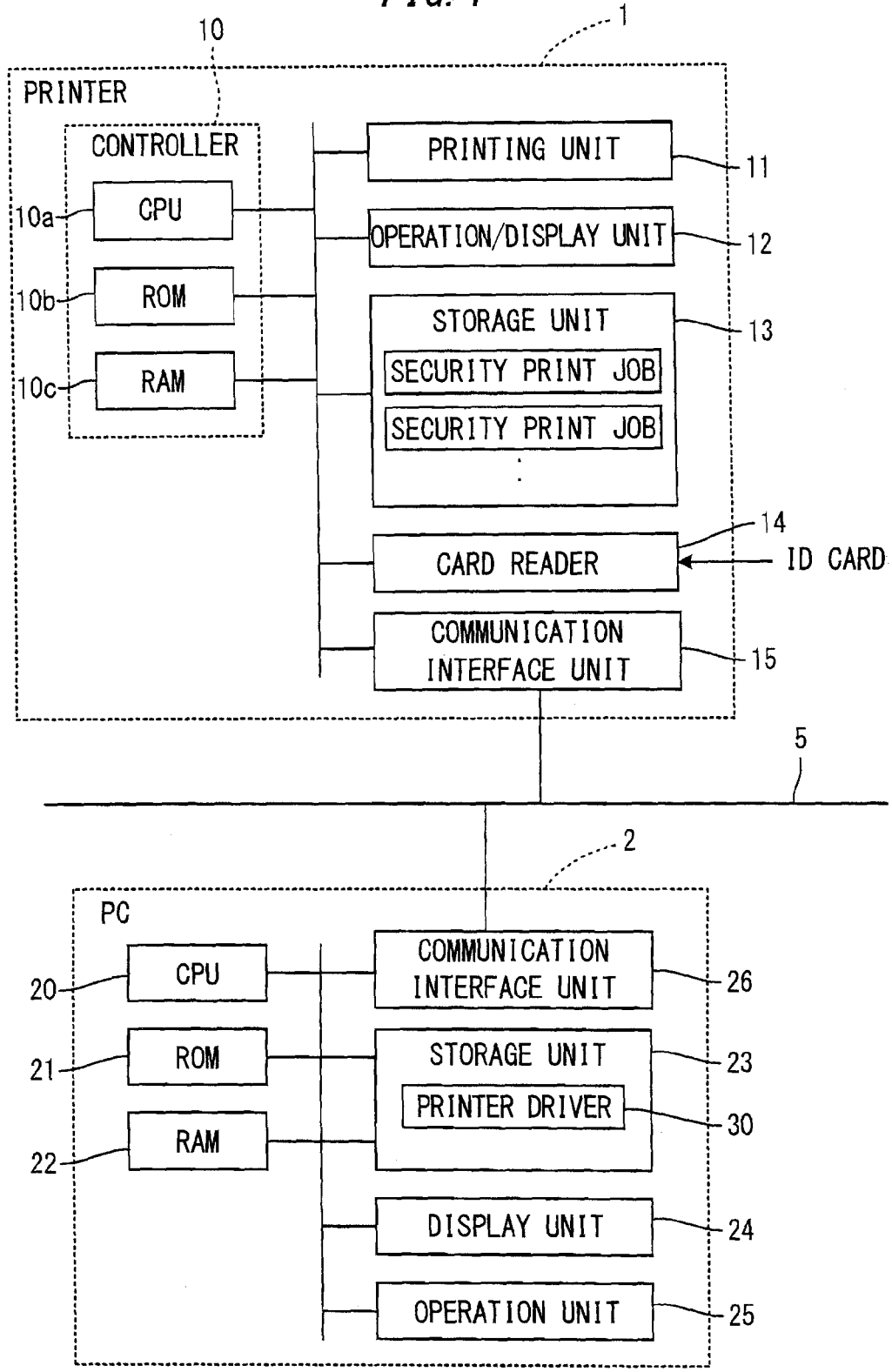
FIG. 1 is a block diagram schematically showing electric configurations of a printer and a PC according to Embodiment 1.

As shown in FIG. 1, a printer 1 is provided with a controller 10, a printing unit 11, an operation/display unit 12, a storage unit 13, a card reader 14, a communication interface unit 15, and the like.

The controller 10 is provided with a CPU 10a, a ROM 10b, a RAM 10c, and the like. The CPU 100a controls the units of the printer 1 by executing a control program stored in the ROM 10b and the storage unit 13. In the ROM 10b, the control program to be executed by the CPU 10a, various data, and the like are stored. The RAM 10c is used as a main storage device for the CPU 10a to execute various processing.

The printing unit 11 is a device for printing an image on a sheet such as a printing paper by an electrophotography method or an inkjet method. The printing unit 11 is one example of the image processer. Also, the printing is one example of the image processing.

The operation/display unit 12 is provided with an operation panel including a display device such as a liquid crystal display and a touch panel covering a display surface of the display device, various operation buttons, and the like. The user inputs a user ID and performs various operations and the like by operating the operation/display unit 12. The user ID is one example of the user information. Also, the operation/display unit 12 is one example of the interface unit.

The storage unit 13 is a device for storing various data by using a hard disk or a nonvolatile memory such as a flash memory. The storage unit 13 stores a security print job described later and the like.

The card reader 14 is a device which reads a user ID stored in an ID card and outputs the read out user ID to the controller 10. The card reader 14 may read the ID card in a contactless manner or may read the ID card upon contact with the ID card. As the ID card, an IC card in which an IC chip is embedded or a magnetic card, for example, may be used. The operation/display unit 12 and the card reader 14 form the receiver.

The communication interface unit 15 is communicably connected to an external device such as a personal computer (hereinafter abbreviated to PC) 2 via a communication network 5 such as a LAN (Local Area Network) and the Internet.

(2) Electric Configuration of PC

Hereinafter, an electric configuration of the PC 2 as an information processing apparatus according to Embodiment 1 will be described with reference to FIG. 1. The PC 2 is provided with a CPU 20, a ROM 21, a RAM 22, a storage unit 23, a display unit 24, an operation unit 25, a communication interface unit 26, and the like.

The CPU 20 controls the units of the PC 2 by executing programs stored in the ROM 21 and the storage unit 23. In the ROM 21, programs and data to be executed by the PC 2 and the like are stored. The RAM 22 is used as a main storage device for the CPU 20 to execute various processing.

The storage unit 23 is a device for storing various programs and data by using a hard disk or a nonvolatile memory such as a flash memory. The storage unit 23 stores a not-shown operating system (OS), application programs, a printer driver 30 which controls the printer 1, and the like. The printer driver 30 is one example of the image processing control program.

The display unit 24 is provided with a display device such as a liquid crystal display, a display driving circuit for driving the display device, and the like.

The operation unit 25 is provided with a keyboard and a mouse.

The communication interface unit 26 communicably connects the PC 2 to the printer 1 via the communication network 5.

(3) Security Printing

The printer 1 is configured to execute a security printing. The security printing means printing in which printing is not executed immediately after sending a print job from the PC 2 to the printer 1, and the printing of the print job is executed when a predetermined operation is performed by the user on the printer 1.

For example, in the case where printing of a print job is executed immediately after the print job is sent from the PC 2 to the printer 1, there is a possibility that a print result is seen by others before the user arrives at the printer 1 to collect the print result. Since the printing is not executed until the user performs the predetermined operation on the printer 1 in the security printing, the print result can be prevented from being seen by others.

In the case of performing the security printing, the user sets security printing in a print job by using the PC 2 and then PC2 sends the print job to the printer 1. In the following description, the print job in which the security printing is set will be referred to as "security print job". In the security print job, a user ID of the user who instructed the security printing is set in addition to the printing conditions set by the user. The printing conditions are one example of the processing conditions.

Upon reception of the security print job from the PC 2, the printer 1 stores the received print job in the storage unit 13. The printer 1 is in a standby state until the user ID is inputted by using the operation/display unit 12 or the card reader 14 and, upon input of the user ID, executes printing of the security print job, including a user ID which is identical to the inputted user ID, among the security print jobs stored in the storage unit 13.

Hereinafter, a user operation performed by using the PC 2 and a user operation performed by using the printer 1 for performing the security printing will be separately described.

(3-1) Operation Performed by Using PC

Figure 2:
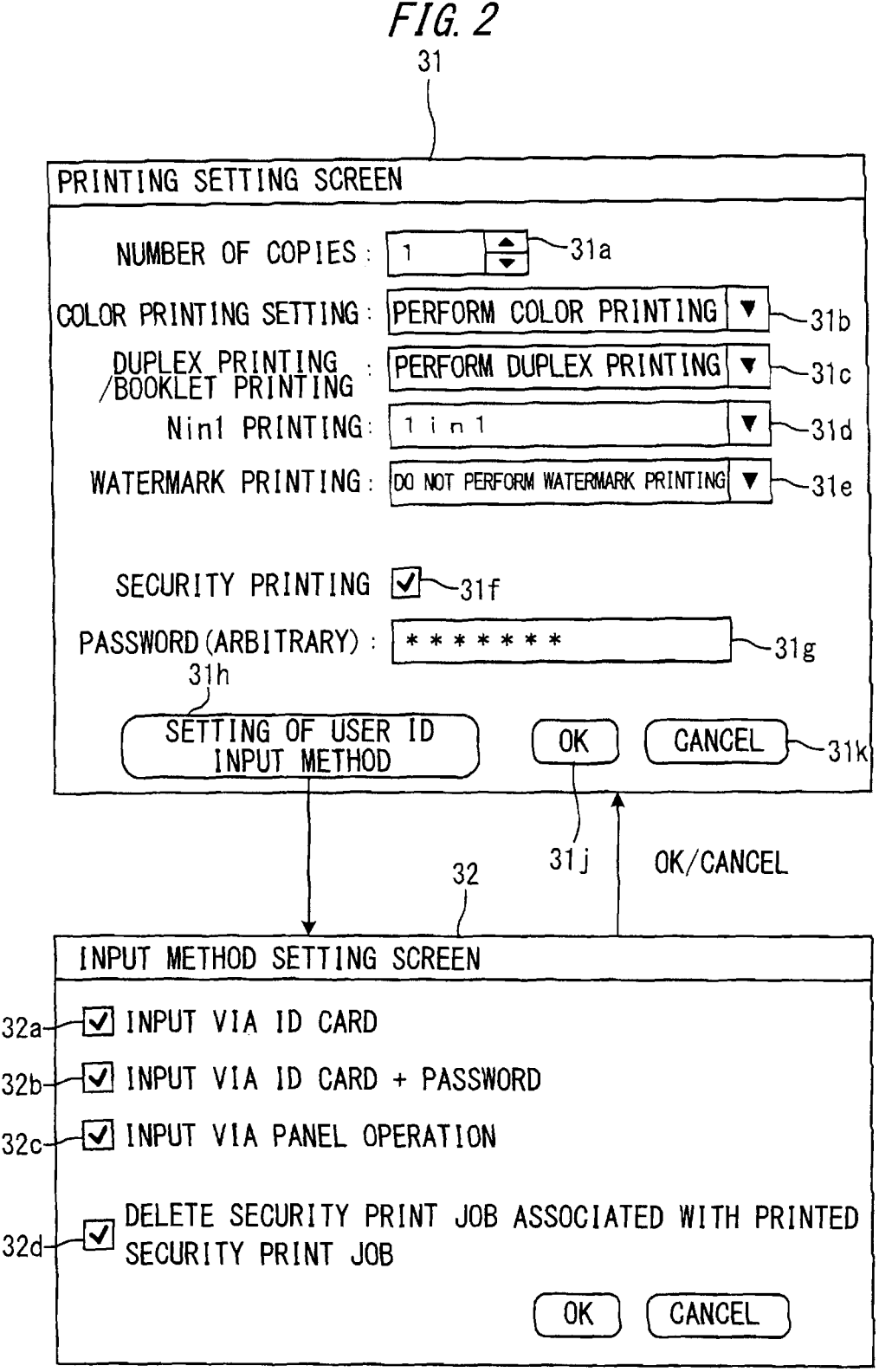
FIG. 2 is screen shots showing a printing setting screen and an input method setting screen.

Firstly, the operation performed by using the PC 2 will be described with reference to FIG. 2. The user selects a printer on a not-shown print screen displayed by the application program and performs a predetermined operation, thereby instructing a printer driver which controls the selected printer to display a printing setting screen. Hereinafter, it is assumed that the printer 1 is selected.

The printer driver controlling the printer 1, i.e. the printer driver 30, displays the printing setting screen 31 on the display unit 24 upon receiving the instruction for displaying the printing setting screen 31. Setting values of printing setting items such as a number of copies 31a, color printing setting 31b, duplex printing/booklet printing 31c, Nin1 printing 31d, and watermark printing 31e can be set on the printing setting screen 31. The printing setting items are one example, and types of the printing setting items to be received can be decided as required.

In the color printing setting 31b, "perform color printing" or "do not perform color printing" can be set.

In the duplex printing/booklet printing 31c, "perform duplex printing", "do not perform duplex printing", or "perform booklet printing" can be set.

In the Nin1 printing 31d, 1in1, 2in1, 4in1, or 9in1 can be set. The Nin1 printing means printing in which a plurality of pages are allocated on one side of a sheet.

In the watermark printing 31e, "do not perform watermark printing", "confidential", or "copy" can be set.

Security printing 31f is an item used by the user for setting whether security printing is to be executed. In the case of performing the security printing, the user sets the security printing 31 to ON.

A password 31g is an item for inputting a password to be set in the security print job in the case of performing the security printing. The password to be inputted can arbitrarily be decided by the user. Decision of whether to input the password is made depending on an input method which is set on an input method setting screen 32 described below.

A user ID input method setting button 31h is a button used for displaying the input method setting screen 32.

The input method setting screen 32 is used by the user for setting an input method for inputting the user ID to the printer 1 in the case of performing the security printing. In the example shown in FIG. 2, "input via ID card" 32a, "input via ID card+password" 32b, and "input via panel operation" 32c can be set as the user ID input method.

The "input via ID card" 32a is the method of inputting the user ID by causing the card reader 14 to read the ID card. When the "input via ID card" 32a is set, input of the password on the printing setting screen 31 is invalid.

The "input via ID card+password" 32b is the input method of inputting the user ID by causing the card reader 14 to read the ID card. When the "input via ID card+password" 32b is set, input of the password is requested after inputting the user ID to the printer 1. In the case where the "input via ID card+password" 32b is set, the input of the password on the printing setting screen 31 is requisite.

The "input via panel operation" 32c is a method of inputting the user ID by operating the operation panel of the printer 1. More specifically, in the input via panel operation, the user operates the printer 1 to display a list of user IDs on the operation panel and selects the user ID of his/her own among the plurality of user IDs in the list to input the user ID. When the "input via panel operation" 32c is set, the input of password on the printing setting screen 31 is requisite.

When the security printing 31f is set to ON on the printing setting screen 31, setting of at least one of the input methods on the input method setting screen 32 is requisite. Also, the user may set a plurality of methods of the input methods. In the case where the plurality of input methods are set, when the user inputs the user ID to the printer 1, the user selects an arbitrary one of the set plurality of input methods and inputs the user ID. The processing of receiving the settings of the input method by displaying the input method setting screen 32 is one example of the input method reception processing.

Also, an item "delete security print job associated with printed security print job" 32d is displayed on the input method setting screen 32. This item will be described later.

When the user clicks on an OK button 31j on the printing setting screen 31, the printer driver 30 updates default printing conditions stored in the RAM 22 with the setting values set on the printing setting screen 31 and the input method setting screen 32 and then displays the above-described printing screen (the not-shown printing screen displayed by the application program) again. On the other hand, when a cancel button 31k is clicked, the printer driver 30 abandons the set setting values and then displays the printing screen again.

When the user instructs the printing on the printing screen, a page to be printed is outputted to the printer driver 30 from the application program via the OS. The page is one example of the image.

After the page to be printed is outputted, the printer driver 30 generates a print job to be used for printing the outputted page and sends the generated print job to the printer 1. In the print job, the printing conditions stored in the RAM 22 and the user ID of the user are set.

When a plurality of input methods are set on the input method setting screen 32, the printer driver 30 generates the print job for each of the set input methods in the above-described print job generation. In other words, the printer driver 30 adds the set input methods to respective ones of the print jobs. For example, when all of the above-described three input methods are set, the printer driver 30 generates three security print jobs in total as the input methods, namely, the security print job in which "input via ID card" is set as the input method, the security print job in which "input via ID card+password" is set as the input method, and the security print job in which "input via panel operation" is set as the input method.

The printer driver 30 associates the security print jobs with one another and sends the security jobs to the printer 1. The association can be performed by setting common association information in each of the security print jobs. Here, if a plurality of input methods are set on the input method setting screen 32, a plurality of security print jobs for the respective input methods are registered in the printer 1 at a predetermined order (for example, the order of (1) input via ID card, (2) input via ID card+password, and (3) input via panel operation).

The processing of setting, in the security print job, the information indicating the input method set on the input method setting screen 32 and then sending (transmitting) the information to the printer 1 is one example of the transmitting processing.

Hereinafter, the "delete security print job associated with printed security print job" 32d to be displayed on the input method setting screen 32 will be described. As described above, when the plurality of input methods are set, the printer 1 generates the security print job for each of the input methods and then sends the security print jobs to the printer 1. When any one of the security print jobs is executed, printings of other security print jobs are no longer necessary since an identical page is to be printed by the print jobs. However, the user may sometimes desire to print the identical page redundantly. The user uses the item for setting whether the other security print jobs which are associated with the printed security print job should be deleted when one of the security print jobs is printed.

(3-2) Operation Performed by Printer

Hereinafter, operations to be performed by using the printer 1 will be described with reference to FIG. 3 to FIG. 6. As described above, the user inputs the user ID in the printer 1 in the case of performing the security printing. The printer 1 does not execute the printing of the security print job immediately after the input of the user ID but provides a user interface which receives the operation relating to the security print job. The printer 1 executes the printing of the security print job in accordance with the operation received by the user interface.

In the above-described user interface, the printer 1 determines the user interface to be provided, depending on the input method employed by the user when the user inputs the user ID to the printer 1. More specifically, when the user ID is inputted by using the ID card, the printer 1 according to Embodiment 1 provides the user interface in which the print processing condition can be set more simply than the user interface provided when the user ID is inputted via the panel operation.

Hereinafter, the user interface in the case where the user ID is inputted by using the ID card will be described first, and then the user interface in the case where the user ID is inputted via the panel operation is described, followed by the reason for varying the user interface depending on the user ID input method.

(3-2-1) Case where User ID is Inputted Via ID Card

Figure 3:
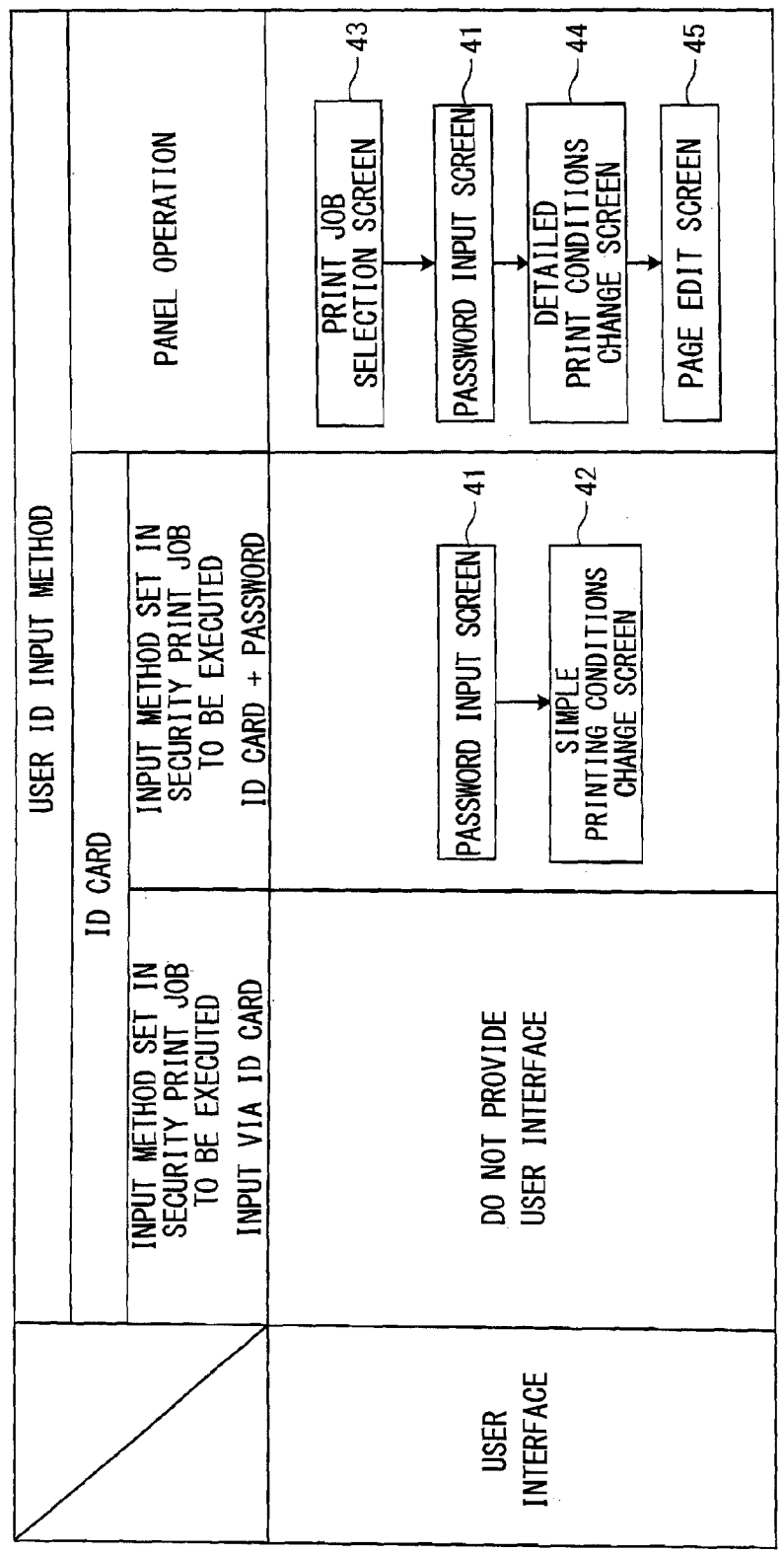
FIG. 3 is a schematic view showing a user interface corresponding to input methods.

Firstly, the user interface in the case where the user ID is inputted by using the ID card will be described with reference to FIG. 3. Selection of the security print job to be executed when the user ID is inputted by using the ID card will be described first, and then the user interface will be described.

When the user ID is inputted by using the ID card, the printer 1 automatically selects the latest security print job as the security print job to be executed among the security print jobs stored in the storage unit 13 in which the user ID identical to the inputted user ID is set and "input via ID card" or "input via ID card+password" is set as the user ID input method.

The reason for automatically selecting the security print job to be executed is that the simple operation is realized by eliminating the selection of the security print job by the user.

Hereinafter, the user interface will be described. The user interface to be provided when the user ID is inputted by using the ID card varies depending on the user ID input method set in the security print job to be executed. The printer 1 does not provide the user interface when "input via ID card" is set as the user ID input method in the security print job to be executed. On the other hand, when "input via ID card+password" is set, the printer 1 displays a password input screen 41 and a simple printing conditions change screen 42 as the user interfaces.

Firstly, the password input screen 41 will be described. The password input screen 41 is a screen used by the user for inputting the password. The printer 1 executes the security print job to be executed, when the password set in the security print job to be executed and the password inputted on the password input screen 41 are identical to each other.

Figure 4:
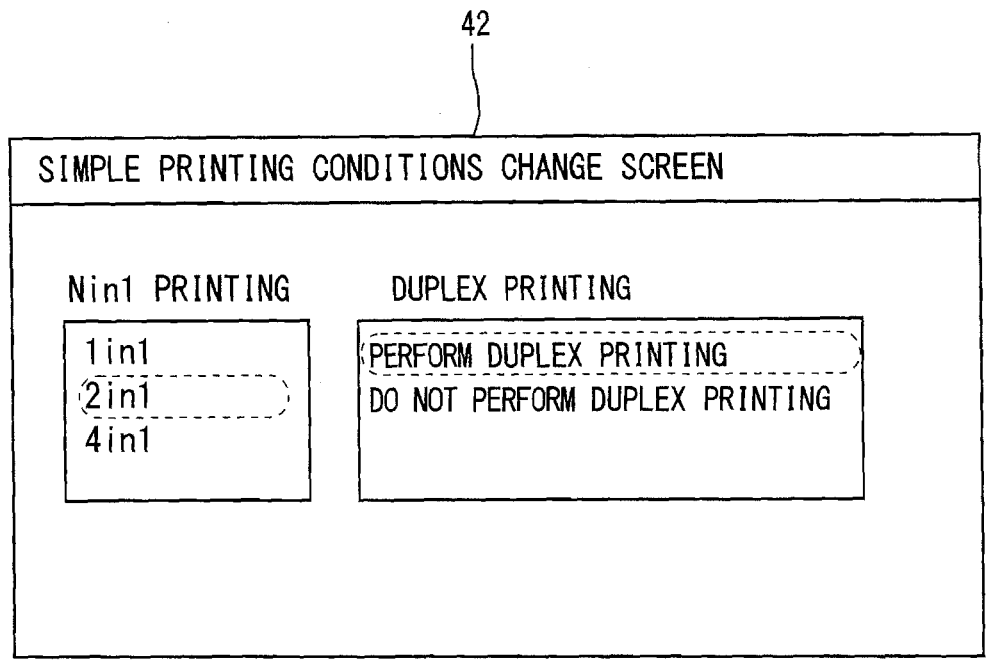
FIG. 4 is a screen shot showing a simple printing conditions change screen.

Hereinafter, the simple printing conditions change screen 42 will be described with reference to FIG. 4. The simple printing conditions change screen 42 is used by the user for changing the printing conditions set in the security print job to be executed. However, the printing setting items of which setting values can be changed on the simple printing conditions change screen 42 are limited to the Nin1 printing and the duplex printing/booklet printing. The reason for the limitation is that a simpler user operation is realized by the reduction in number of printing setting items of which the setting values can be changed.

Also, 1in1, 2in1, 4in1, and 9in1 can be set as the setting values of the Nin1 printing on the above-described printing setting screen 31, but, on the simple printing conditions change screen 42, setting values after the change are limited to 1in1, 2in1, and 4in1, and the change into 9in1 is not offered. The reason for the limitation is that a simpler user operation is realized by the reduction in number of setting values which can be changed.

Same applies to the duplex printing/booklet printing. On the simple printing conditions change screen 42, setting values after the change are limited to "perform duplex printing" and "do not perform duplex printing", and the change into "perform booklet printing" is not offered.

The printing setting items and the setting values to be changed on the simple printing conditions change screen 42 are not limited to the above-described examples, and any setting items and values may be changed as long as the number of them is smaller than a detailed printing conditions change screen 44 described later in this specification.

The simple printing conditions change screen 42 is one example of the user interface to be used by the user for setting the processing conditions of the image processing.

(3-2-2) Case where User ID is Inputted Via Panel Operation

Hereinafter, the user interface in the case where the user ID is inputted via the panel operation will be described with reference to FIG. 3. When the user ID is inputted via the panel operation, the printer 1 displays a print job selection screen 43, the password input screen 41, the detailed printing conditions change screen 44, and a page edit screen 45 as the user interfaces.

Firstly, the print job selection screen 43 will be described. The print job selection screen 43 is the screen used by the user for designating a security print job to be executed among security print jobs stored in the storage unit 13.

The print job selection screen 43 displays a list of security print jobs stored in the storage unit 13, in which a user ID which is identical to the inputted user ID is set and "input via panel operation" is set as the user ID input method. The user designates the security print job to be executed among the security print jobs displayed in the list.

The print job selection screen 43 is one example of the user interface which is used by the user for designating the image to be processed by the image processing.

Figure 5:
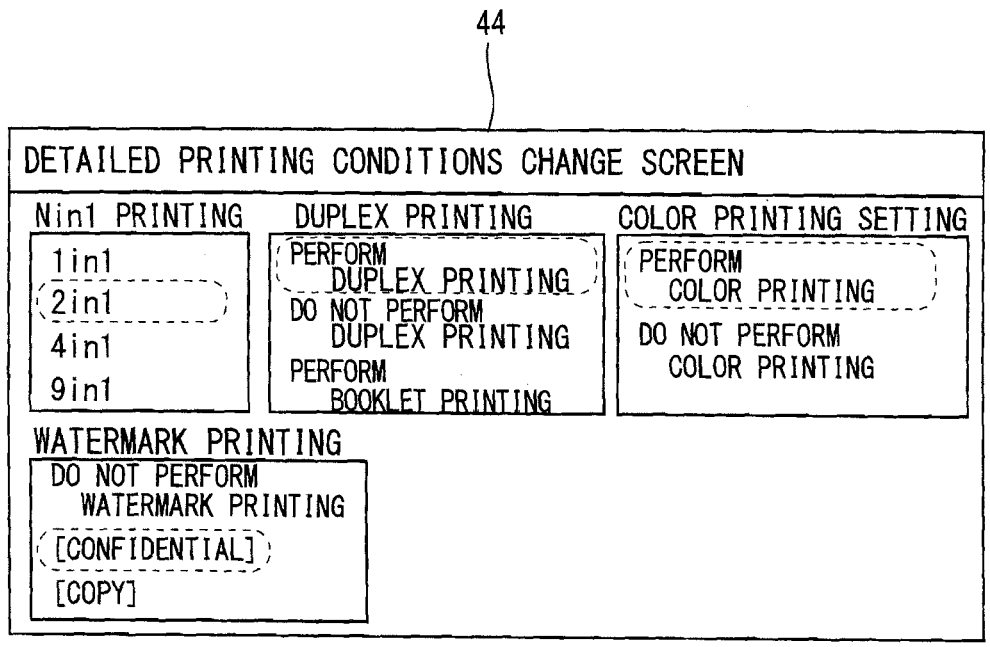
FIG. 5 is a screen shot showing a detailed printing conditions change screen.

Hereinafter, the detailed printing conditions change screen 44 will be described with reference to FIG. 5. The printing setting items of which the setting values can be changed on the above-described simple printing conditions change screen 42 are limited to the Nin1 printing and the duplex printing/booklet printing, but a setting value of the color printing setting and a setting value of the watermark printing can be changed on the detailed printing conditions change screen 44 in addition to these setting values.

Also, changeable setting values are not restricted on the detailed printing conditions change screen 44, and setting values can be changed to values which are the same as those which can be set on the printing setting screen 31. For example, the setting value of the Nin1 printing can be changed to 9in1, and the setting value of the duplex printing/booklet printing can be changed to "perform booklet printing". The detailed printing conditions change screen 44 is one example of the user interface which is used by the user for setting the processing conditions of the image processing.

Figure 6:
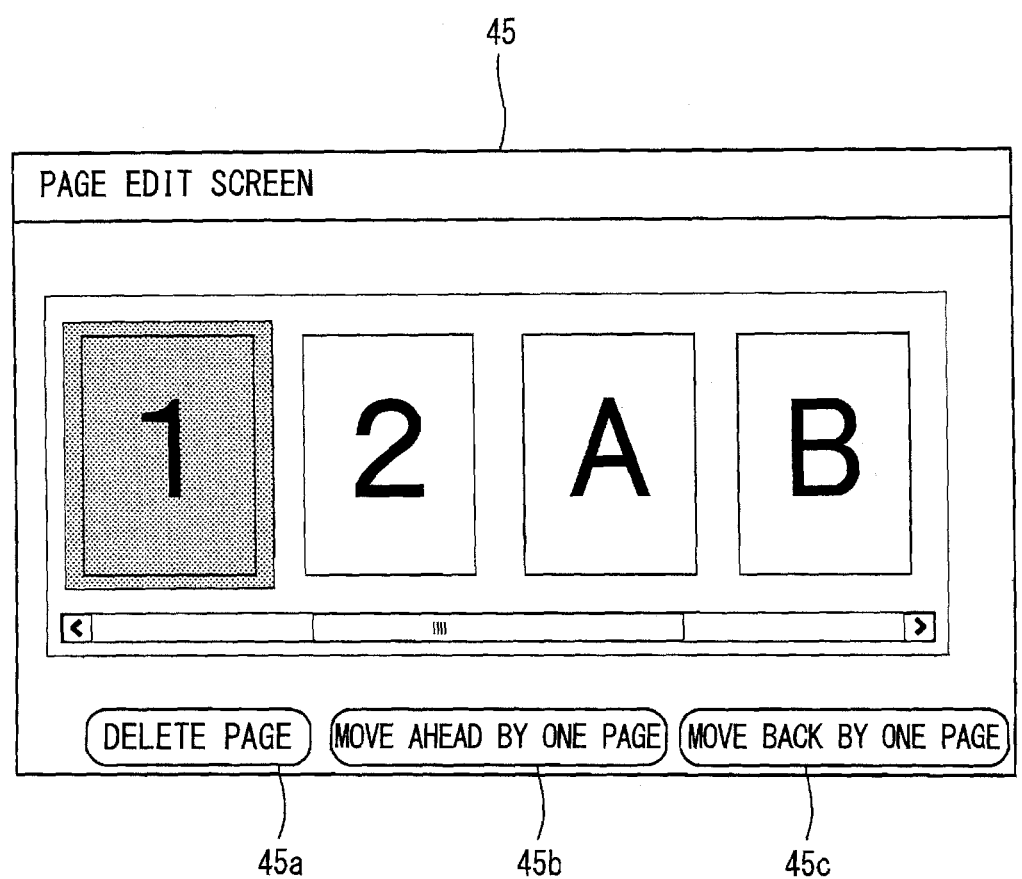
FIG. 6 is a screen shot showing a page edit screen.

Hereinafter, the page edit screen 45 will be described with reference to FIG. 6. The page edit screen 45 is a screen used for deleting a page or pages stored in the security print job to be executed and for editing a printing order of the pages. Thumbnail images of the pages stored in the security print job to be executed are displayed on the page edit screen 45. The thumbnail images of all of the pages are sequentially displayed when the user scrolls on the thumbnail images.

When the user selects one of the thumbnail images and touches a delete page button 45a, the page corresponding to the selected thumbnail image is deleted. Also, when the user selects one of the thumbnail images and touches a button 45b for moving ahead by one page, the printing orders of the page corresponding to the selected thumbnail and the page just before the selected page are exchanged with each other. Same applies to a button 45c for moving back by one page.

The page edit screen 45 is one example of each of the user interface which is used by the user for selecting the image which is excluded from the group of images stored in the image processing job to be executed and the user interface which is used by the user for changing the processing order of the images forming the group of images.

The page edit screen 45 may be a screen which has only the function of selecting the page which is excluded from printing or a screen which has only the function of changing the printing order of the pages.

(3-2-3) Reason for Varying User Interface

Hereinafter, the reason why the user interface is varied depending on the user ID input method will be described.

As the needs of the users for user interfaces, there are the needs for a simple operation in which the number of items to be set is reduced and there are the needs for the larger number of settable items even if the operation is complicated.

Since the input of user ID via operation panel requires the operation of causing the list of user IDs to be displayed on the operation panel and the operation of selecting the user ID of the user among the plurality of user IDs in the list, the number of required operations is two. Also, since it is necessary to scroll the screen when the number of displayed user IDs is large, the number of operations can be three or more depending on the case.

On the other hand, since the input of user ID via the ID card only requires the passing of the ID card over the card reader 14, the number of operations is one. That is, the input of user ID via ID card is the input method of which the number of operations (the number of operations for inputting the user ID) is smaller than that of the user ID input via panel operation.

Since the user who inputs the user ID via the ID card selects the input method of which the number of operations is small to input the user ID, it is assumed that the user desires the reduced number of operations. In the case of such a user, it is assumed that the simplified operation with small number of settable items meets the needs of the user. Therefore, when the user ID is inputted via the ID card, the printer 1 provides the user interface in which the print processing condition can be set more simply than the user interface provided when the user ID is inputted via the panel operation, or the printer 1 does not provide even a single user interface.

On the other hand, since the user who inputs the user ID via the panel operation selects the input method of which the number of operations is larger to input the user ID, it is assumed that the user is not so reluctant to perform the large number of operations. In the case of such a user, it is assumed that the larger number of settable items meets the needs of the user even if the operation is complicated. Therefore, when the user ID is inputted via the panel operation, the printer 1 provides the user interface in which the print processing condition can be set in more detail (more specifically) than the user interface provided when the user ID is inputted by using the ID card.

(4) User Interface Determination Processing

Figure 7:
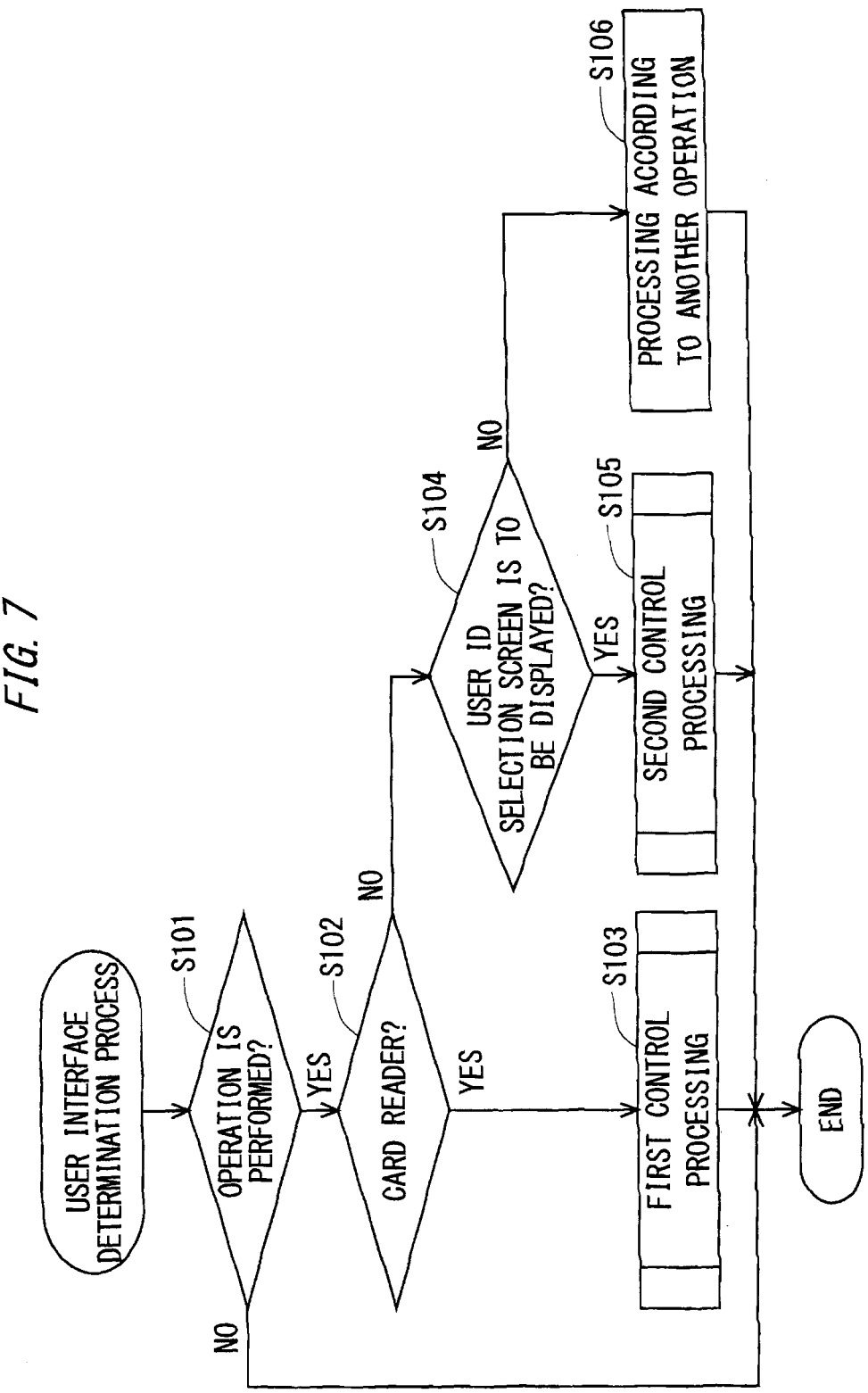
FIG. 7 is a flowchart showing a user interface determination process.

Hereinafter, user interface determination processing to be executed by the printer 1 will be described with reference to FIG. 7. The user interface determination processing is one example of the determination process. The processing is executed repeatedly at a constant time interval such as 0.1 second during a period when the power of the printer 1 is ON.

In S101, the controller 10 determines whether either one of the operation of causing the card reader 14 to read the ID card, the operation of causing the operation panel to display the user ID selection screen, and other operation is performed. The operation of displaying the user ID selection screen and other operation are performed by operating the operation/display unit 12.

The controller 10 proceeds to S102 when either one of the operations is performed (S101: YES). When none of the operations is performed (S101: NO), the controller 10 terminates the processing.

In S102, the controller 10 determines whether the performed operation is the reading operation the ID card, and proceeds to S103 when the reading operation the ID card is performed (S102: YES) or proceeds to S104 when the performed operation is another operation (S102: NO).

In S103, the controller 10 executes first control processing.

In S104, the controller 10 determines whether the performed operation is the operation of displaying the user ID selection screen on the operation panel, and proceeds to S105 when the performed operation is the operation of displaying the user ID selection screen (S104: YES) or proceeds to S106 when the performed operation is another operation (S104: NO).

In S105, the controller 10 executes second control processing.

In S106, the controller 10 executes processing corresponding to the other operation.

Each of the above-described first control processing and the second control processing is one example of the control processing.

(4-1) First Control Processing

Figure 8:
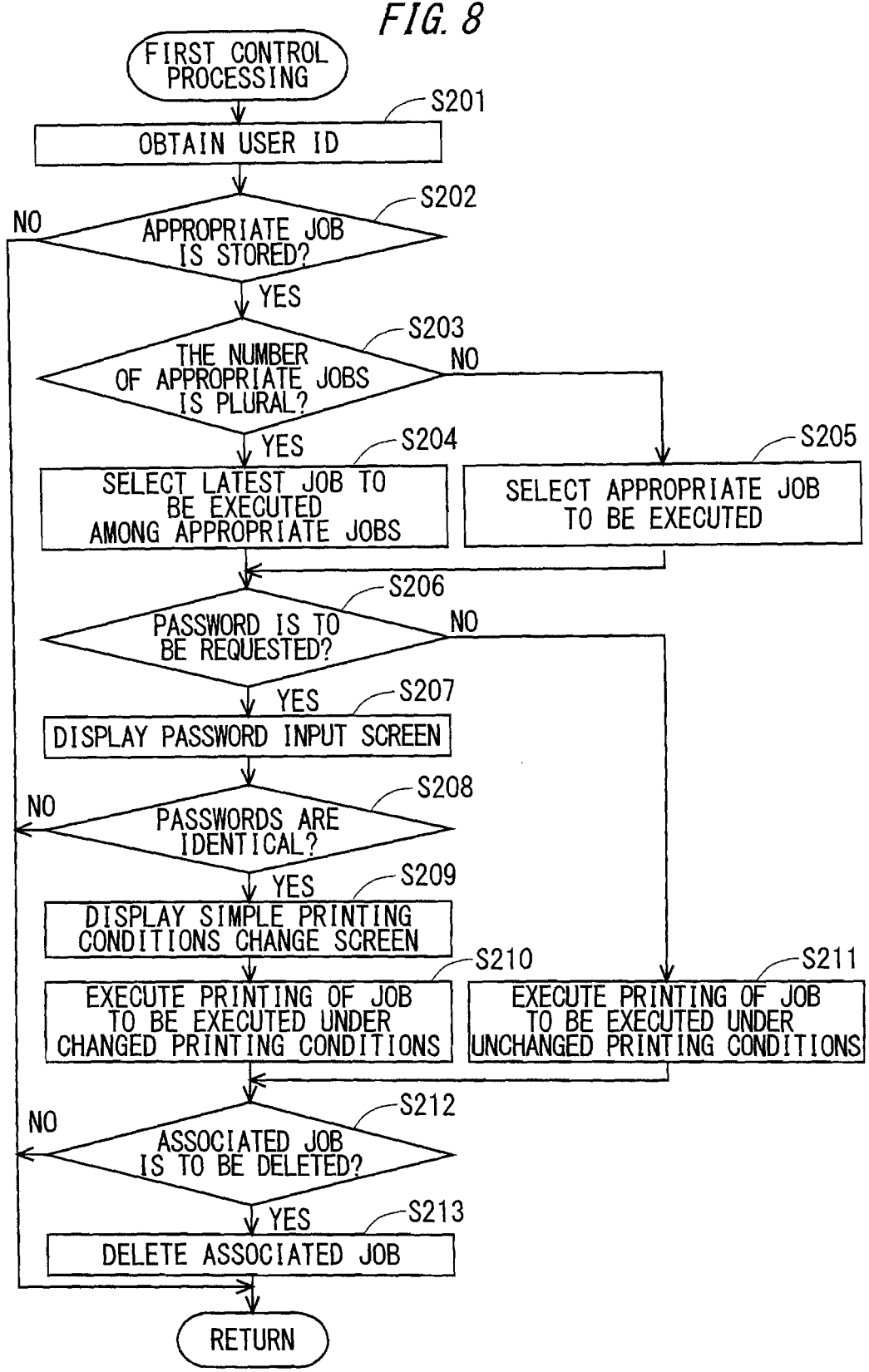
FIG. 8 is a flowchart showing first control processing.

Hereinafter, the first control processing executed in S103 will be described with reference to FIG. 8.

In S201, the controller 10 obtains the user ID read out by the card reader 14.

In S202, the controller 10 determines whether a security print job (hereinafter referred to as "appropriate security print job") in which a user ID identical to the user ID obtained in S201 is set and in which "input via ID card" or "input via ID card +password" is set as the user ID input method is stored in the storage unit 13.

The controller 10 proceeds to S203 when the appropriate security print job is stored (S202: YES). The controller 10 terminates the processing and returns to the user interface the determination process when the appropriate security print job is not stored (S202: NO).

In S203, the controller 10 determines whether the number of the stored appropriate security print jobs is plural, and proceeds to S204 when the number is plural (S203: YES) or proceeds to S205 when the number is one (S203: NO).

In S204, the controller 10 selects the latest print job among the appropriate security print jobs as the security print job to be executed.

In S205, the controller 10 selects the appropriate security print job as the security print job to be executed.

In S206, the controller 10 determines that input of a password is required to proceed to S207 when the input method set in the security print job to be executed is "input via ID card+password" (S206: YES). When the input method is "input via ID card" (S206: NO), the controller 10 determines that the input of a password is not required to proceed to S211.

In S207, the controller 10 displays the password input screen 41.

In S208, the controller 10 determines whether the password set in the security print job to be executed and the password inputted on the password input screen 41 are identical to each other. The controller 10 proceeds to S209 when the passwords are identical to each other (S208: YES), or terminates the processing and returns to the user interface determination process when the passwords are not identical to each other (S208: NO).

In S209, the controller 10 display the simple printing conditions change screen 42.

In S210, the controller 10 executes printing of the security print job to be executed under the printing conditions which are changed on the simple printing conditions change screen 42.

In S211, the controller 10 executes printing of the security print job to be executed under the unchanged printing conditions set in the security print job to be executed.

In S212, the controller 10 determines whether the setting value of "delete security print job associated with the printed security print job" of the printing conditions set in the security print job to be executed is ON, and proceeds to S213 in the case of ON (S212: YES) or terminates the processing and returns to the user interface determination process in the case of OFF (S212: NO).

In S213, the controller 10 deletes the security print job associated with the security print job to be executed from the storage unit 13. After that, the controller 10 terminates the processing and returns to the user interface determination process.

(4-2) Second Control Processing

Figure 9:
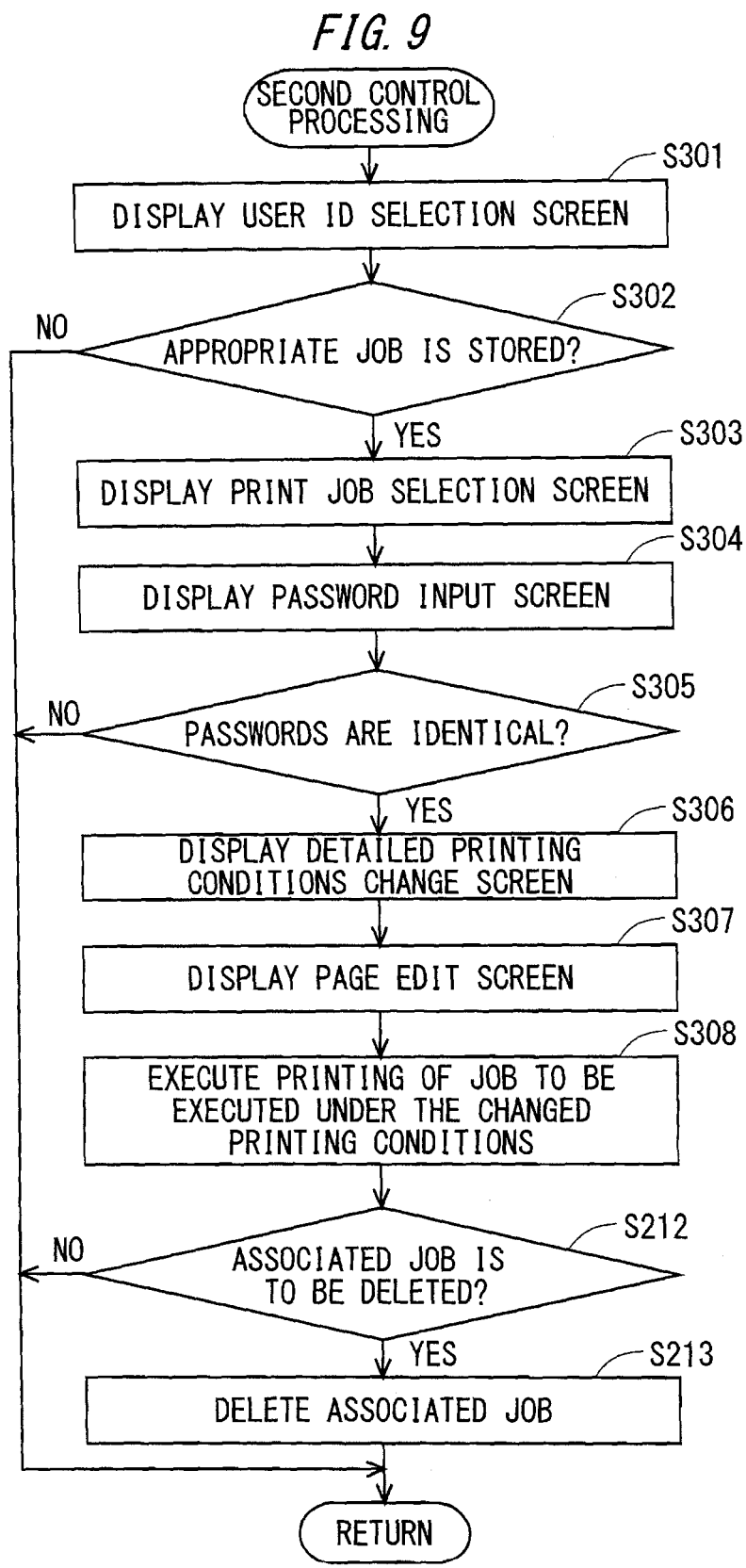
FIG. 9 is a flowchart showing second control processing.

Hereinafter, the second control processing executed in S105 will be described with reference to FIG. 9.

In S301, the controller 10 reads out user IDs from all of the security print jobs stored in the storage unit 13. The controller 10 displays the user ID selection screen to be used for the selection of a user ID on the operation panel and displays a list of the read out user IDs on the user ID selection screen. The user inputs the user ID to the printer 1 by selecting his/her user ID among the user IDs displayed in the list.

In S302, the controller 10 determines whether a security print job (hereinafter referred to as "appropriate security print job") in which a user ID identical to the user ID inputted on the user ID selection screen is set and the "input via panel operation" is set as the user ID input method is stored in the storage unit 13. The controller 10 proceeds to S303 when the appropriate security print job is stored (S302: YES) or terminates the processing and returns to the user interface determination process when the appropriate security print job is not stored (S302: NO).

In S303, the controller 10 displays the print job selection screen 43.

In S304, the controller 10 displays the password input screen 41.

In S305, the controller 10 determines whether the password set in the security print job to be executed selected on the print job selection screen 43 and the password inputted on the password input screen 41 are identical to each other, and proceeds to S306 when the passwords are identical to each other (S305: YES) or terminates the processing and returns to the user interface determination process when the passwords are not identical to each other (S305: NO).

In S306, the controller 10 displays the detailed printing conditions change screen 44.

In S307, the controller 10 displays the page edit screen 45.

In S308, the controller 10 executes printing of the security print job to be executed. The printing reflects the change in printing conditions made in S306 and the page editing performed in S307.

S212 and S213 are not described here since they are the same as the processing described in the first control processing.

(5) Effects of Embodiment

With the printer 1 according to Embodiment 1 described above, the user interface is not provided when the user ID is inputted by "input via ID card", while the user interface is provided when the ID is inputted by "input via ID card+password" or "input via panel operation". Furthermore, when the user ID is inputted by "input via ID card+password", the user interface is provided in which the print processing condition can be set more simply than the user interface provided when the user ID is inputted by "input via panel operation". On the other hand, when the user ID is inputted by "input via panel operation", the user interface is provided in which the print processing condition can be set in more detail than the user interface provided when the user ID is inputted by "input via ID card+password".

Further, with the printer 1, the user interface which meets the needs of the user can be provided when the user designates the security print job to be executed. More specifically, since the security print job to be executed is automatically selected when the user inputs the user ID via the ID card, the user interface which meets the needs of the user who desires simple operation can be provided. In contrast, since the print job selection screen 43 is displayed when the user inputs the user ID via the panel operation, the user interface can be provided which meets the needs of the user who desires to set many items even if the operation is complicated.

Further, with the printer 1, the user interface which meets the needs of the user can be provided in the case of changing the setting values of the printing conditions which are set in the security print job. More specifically, since the simple printing conditions change screen 42 is displayed when the user inputs the user ID via the ID card, the user interface can be provided which meets the needs of the user who desires simple operation with small number of settable items. In contrast, since the detailed printing conditions change screen 44 is displayed when the user inputs the user ID via the panel operation, the user interface can be provided which meets the needs of the user who desires to set many items even if the operation is complicated.

Further, with the printer 1, when the user selects a page which should not be printed from among a group of pages stored in the security print job to be executed and when the user edits the printing order of the pages forming the group of pages, the user interface which meets the needs of the user can be provided. More specifically, when the user ID is inputted via the ID card, the page edit screen 45 is not displayed, so that the user does not have to perform the selection of the page which should not be printed and the editing of the printing order of the pages. In contrast, when the user ID is inputted via the panel operation, the page edit screen 45 is displayed so that the user can select the page which should not be printed and can edit the printing order of the pages.

Also, with the printer driver 30 according to Embodiment 1, the user can select the input method to be employed for inputting the user ID to the printer 1 by setting the user ID input method on the PC 2.

<Embodiment 2>

Figure 10:
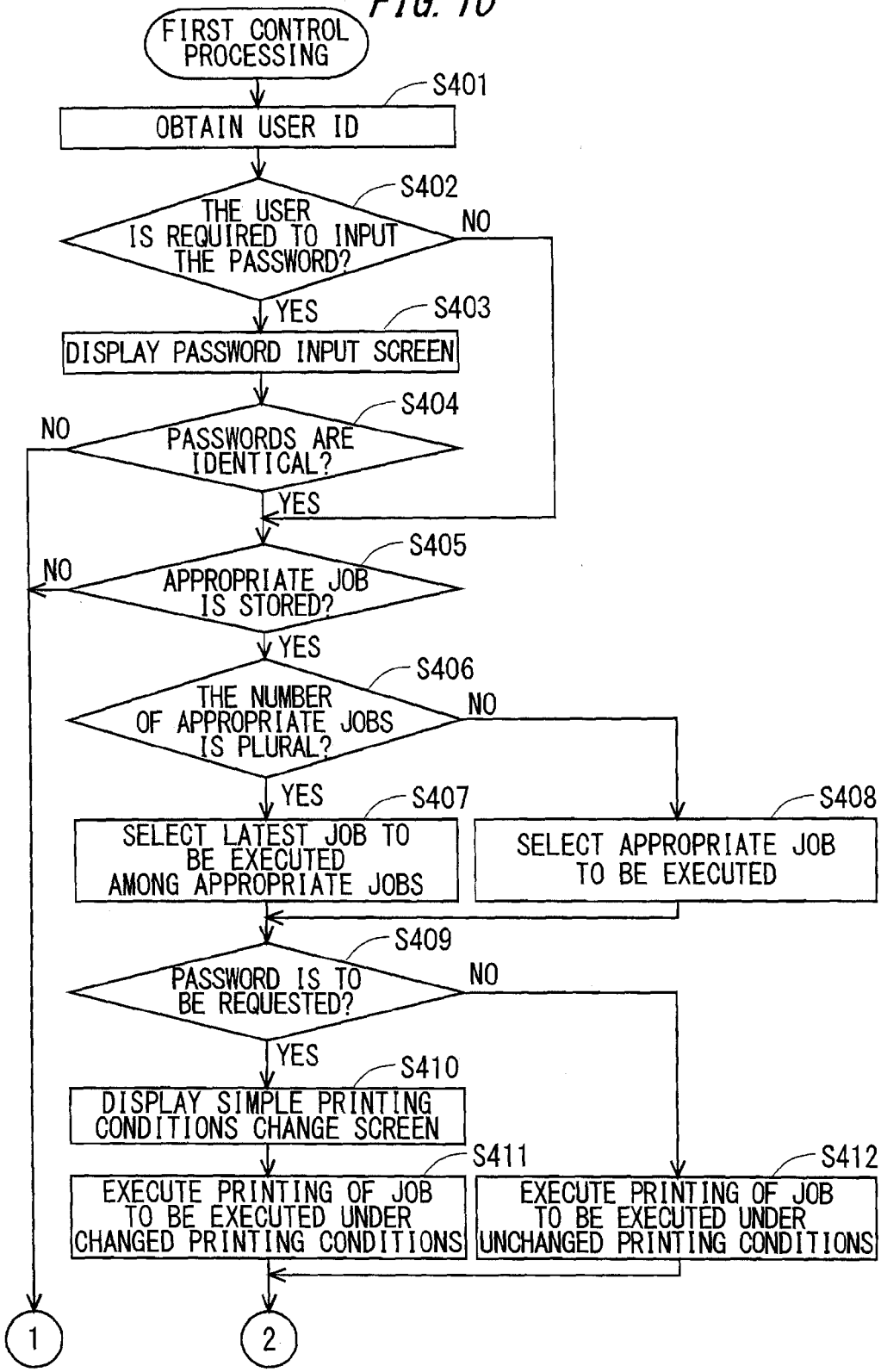
FIG. 10 is a flowchart showing first control processing according to Embodiment 2.
Figure 11:
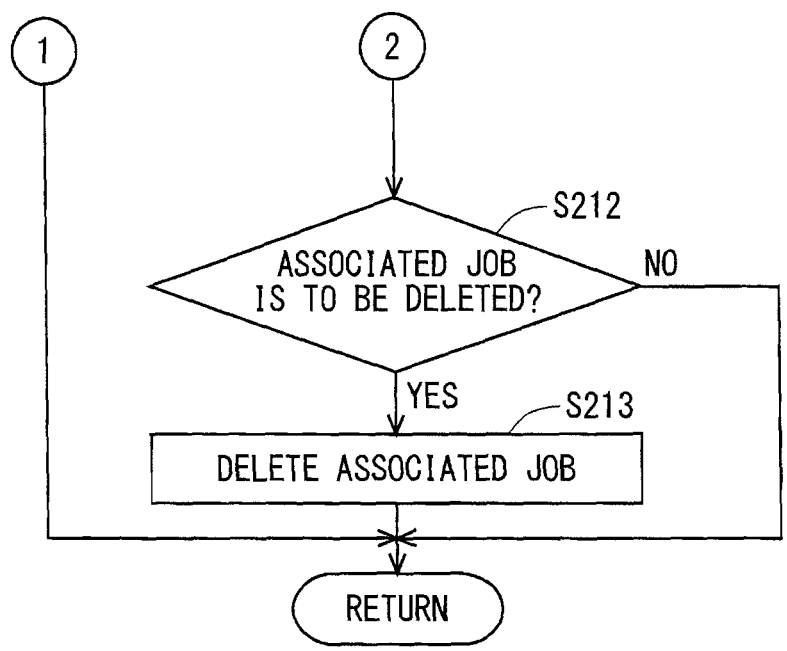
FIG. 11 is a flowchart showing first control processing.

Hereinafter, Embodiment 2 will be described with reference to FIG. 10 and FIG. 11.

In Embodiment 1 described above, the case was described by way of example, in which it is determined whether the password inputted by the user and the password set in the security print job to be executed are identical to each other. In contrast, in Embodiment 2, user IDs of users and passwords are previously registered in association with each other in the printer 1, and it is determined whether a password inputted by the user and the password registered in the printer 1 are identical to each other.

A part of the users is not required to input the password. The user ID of such a user is registered in association with information indicating that the user is not required to input the password.

(1) First Control Processing

Firstly, the first control processing according to Embodiment 2 will be described with reference to FIG. 10 and FIG. 11.

In S401, the controller 10 obtains the user ID read out by the card reader 14.

In S402, the controller 10 determines whether the user is required to input the password based on the user ID obtained in S401. More specifically, when the information indicating that the input of password is unnecessary is not associated with the obtained user ID (S402: YES), the controller 10 determines that the user is required to input the password and proceeds to S403. When the information indicating that the input of password is unnecessary is associated (S402: NO), the controller 10 determines that the user is not required to input the password and proceeds to S405.

In S403, the controller 10 displays the password input screen 41.

In S404, the controller 10 determines whether the password registered in the printer 1 in association with the user ID obtained in S401 and the password inputted by the user are identical to each other, and, when the passwords are identical to each other (S404: YES), the controller 10 determines the inputted password as the correct password to proceed to S405. When the passwords are not identical to each other (S404: NO), the controller 10 terminates the processing and returns to the user interface determination process.

In S405, the controller 10 determines whether the storage unit 13 stores a security print job (hereinafter referred to as "appropriate security print job") in which a user ID identical to the user ID obtained in S401 is set and in which "input via ID card" or "input via ID card+password" is set as the user ID input method.

The controller 10 proceeds to S406 when the appropriate security print job is stored (S405: YES) or terminates the processing and returns to the user interface determination process when the appropriate security print job is not stored (S405: NO).

In S406, the controller 10 determines whether the number of the stored appropriate security print jobs is plural, and proceeds to S407 when the number is plural (S406: YES) or proceeds to S408 when the number is one (S406: NO).

In S407, the controller 10 selects the latest print job among the appropriate security print jobs as the security print job to be executed.

In S408, the controller 10 selects the appropriate security print job as the security print job to be executed.

In S409, the controller 10 proceeds to S410 when the user is determined to be the one who is required to input the password in S402 (S409: YES), or proceeds to S412 when the user is determined to be the one who is not required to input the password in S402 (S409: NO).

In S410, the controller 10 displays the simple printing conditions change screen 42.

In S411, the controller 10 executes printing of the security print job to be executed under the printing conditions which are changed on the simple printing conditions change screen 42.

In S412, the controller 10 executes printing of the security print job to be executed under the unchanged printing conditions set in the security print job to be executed.

S212 and S213 are not described here since they are the same as the processing described in Embodiment 1.

(2) Second Control Processing

Figure 12:
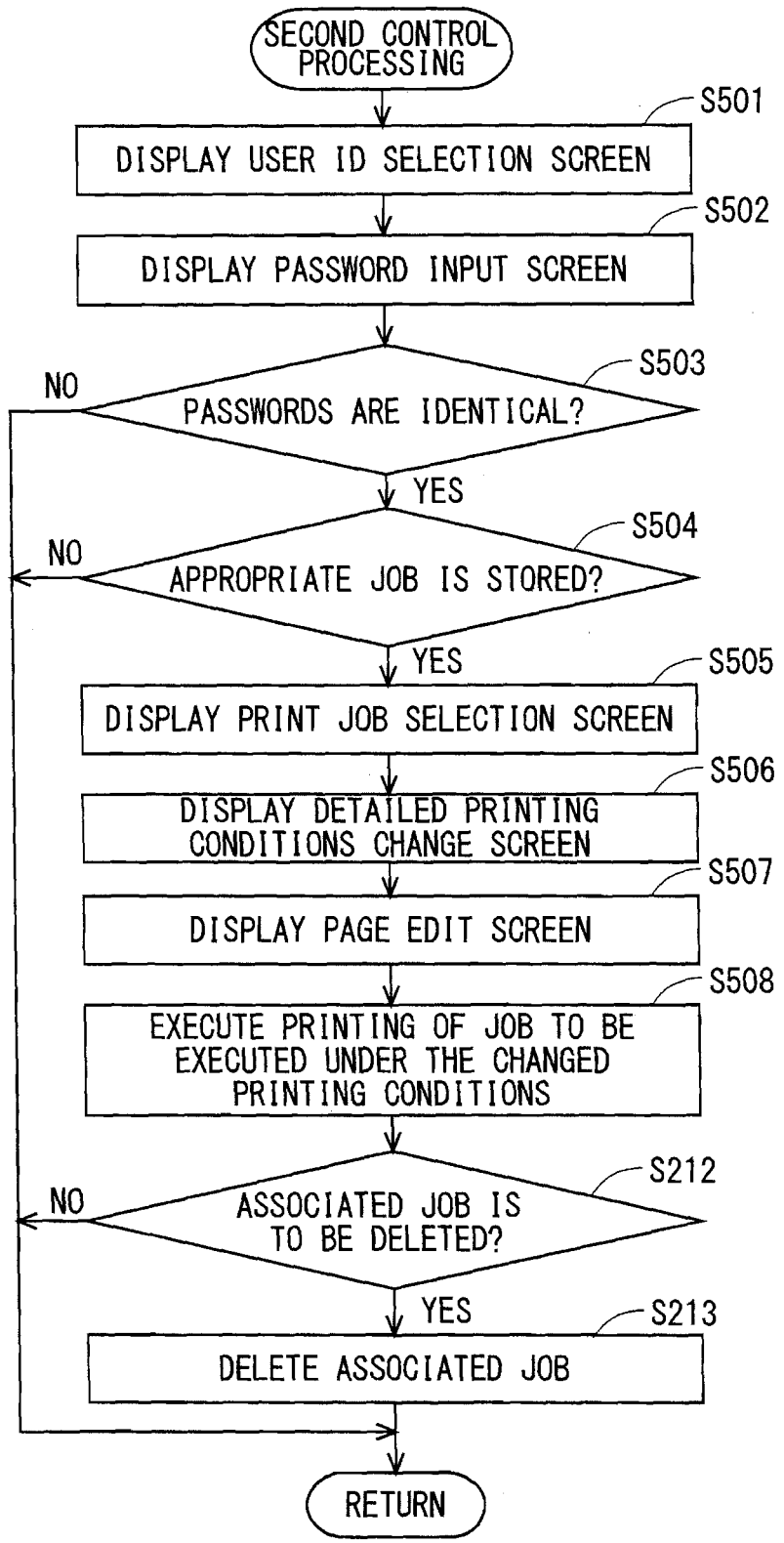
FIG. 12 is a flowchart showing second control processing.

Hereinafter, the second control processing according to Embodiment 2 will be described with reference to FIG. 12.

In S501, the controller 10 displays the user ID selection screen.

In S502, the controller 10 displays the password input screen 41.

In S503, the controller 10 determines whether the password registered in the printer 1 in association with the user ID selected in S501 and the password inputted on the password input screen 41 are identical to each other. When the passwords are identical to each other (S503: YES), the controller 10 determines the inputted password as the correct password to proceed to S504. When the passwords are not identical to each other (S503: NO), the controller 10 terminates the processing and returns to the user interface determination process.

In S504, the controller 10 determines whether the storage unit 13 stores a security print job (hereinafter referred to as "appropriate security print job") in which a user ID identical to the user ID selected in S501 is set and in which "input via panel operation" is set as the user ID input method. The controller 10 proceeds to S505 when the appropriate security print job is stored (S504: YES), or terminates the processing and returns to the user interface determination process when the appropriate security print job is not stored (S504: NO).

In S505, the controller 10 displays the print job selection screen 43.

In S506, the controller 10 displays the detailed printing conditions change screen 44.

In S507, the controller 10 displays the page edit screen 45.

In S508, the controller 10 executes printing of the security print job to be executed. The printing reflects the change in printing conditions made in S506 and the page editing performed in S507.

S212 and S213 are not described here since they are the same as the processing described in Embodiment 1.

Since the password inputted on the printing setting screen 31 is not used in Embodiment 2, the printing setting screen 31 may be modified so that no password is inputted. Also, for the same reason, the input methods to be set on the input method setting screen 32 may be limited to "input via ID card" 32a and "input via panel operation" 32c.

(3) Effects of Embodiment

With the printer 1 according to Embodiment 2 described above, the user interface which better meets the needs of the user can be provided in the case of providing the user interface which receives operations relating to printing after the user ID is inputted.

<Embodiment 3>

Hereinafter, Embodiment 3 will be described with reference to FIG. 13.

The user interfaces corresponding to the user ID input methods are fixed (preset) in Embodiment 1 and Embodiment 2 described above. In contrast, a user interface corresponding to each of the input methods can be set by a user in Embodiment 3.

Setting of the user interface corresponding to each of the input methods will be described with reference to FIG. 13. The user operates the operation/display unit 12 to request the setting of the user interface. When the setting of the user interface is requested, the controller 10 displays a user interface setting screen 46 on the operation panel.

The user interface setting screen 46 is the screen to be used by the user for setting the user interface corresponding to the input of user ID via panel operation and the user interface corresponding to the input of user ID via ID card. Since identical setting methods are employed for setting the both user interfaces, the case of setting the user interface corresponding to the input of user ID via panel operation will be described herein by way of example.

In the setting of the user interface, the user is allowed to set display of printing conditions change screen 46a, display of page edit screen 46b, and selection of print job 46c.

In the display of printing conditions change screen 46a, the user is allowed to select display simple printing conditions change screen 42, display detailed printing conditions change screen 44, or do not display any printing condition change screen.

In the display of page edit screen 46b, the user is allowed to select display page edit screen 45 or do not display page edit screen 45.

In the selection of print job 46c, the user is allowed to select display print job selection screen 43, print latest job (automatically select the latest security print job), or print oldest job (automatically select the oldest security print job).

The processing of receiving from the user the settings of the user interface corresponding to each of the input methods by displaying the user interface setting screen 46 is one example of the interface setting processing.

When the printer 1 receives an input of a user ID after the user interface corresponding to each of the input methods is set via the user interface setting screen 46, the printer 1 determines (selects) the user interface which corresponds to the input method and which is set on the user interface setting screen 46.

With the printer 1 according to Embodiment 3 described above, the user interface which better meets the needs of the user can be provided since the user interface corresponding to each of the input methods can be set by the user.

While the invention has been described in detail with reference to the above aspects thereof, it would be apparent to those skilled in the art that various changes and modifications may be made therein without departing from the scope of the claims.

(1) In the foregoing description, the user ID is described as one example of the user information. However, the user information is not limited to the user ID as long as the user information is information inputted by the user. For example, a password may be set in each of security print jobs, and input of the password is received in place of the user ID, followed by selection of a security print job to be executed among security print jobs in which the received password is set. Alternatively, the user information may be a group ID of a group to which the user belongs. The type of information to be used as the user information can be decided as required.

Also, the input of the user information may be performed via voice input. In the foregoing embodiments, the user ID is selected from the displayed list of user IDs, by way of example of the user ID input method via panel operation. In contrast, the user ID may be inputted via operation on the keyboard, for example.

(2) In the foregoing embodiments, the user interface is provided in which the number of operations is smaller when the user ID is inputted via the ID card than the case where the user ID is inputted via the panel operation, by way of example. In contrast, the user interface may be provided in which the number of operations to be received is smaller when the user ID is inputted via the panel operation than the case where the user ID is inputted via the ID card.

In this case, although the number of operations for inputting the user ID per se is increased for the user who desires simple operation as a result of inputting the user ID via the panel operation, the user interface which meets the needs of the user can be provided.

(3) In the foregoing embodiments, the user interfaces are provided by displaying the screens on the operation panel, by way of example. However, the user interfaces are not limited to them. For example, a user interface which receives the operations via voice input may be provided.

(4) In the forgoing embodiments, the printer 1 is described by way of example of the image processing apparatus. In contrast, the image processing apparatus may be a so-called multifunction peripheral (MFP) provided with a printer function, a scanner function, a facsimile function, a copying function, and so forth.

In such a case, the image processing job may be a copying job. For example, input of a user ID is sometimes requested in order to count the cumulative number of copies of each of users. In such a case, a user interface for receiving operations relating to a copying job may be determined (changed) depending on a user ID input method.

Alternatively, the image processing job may be a reading (scanning) job of reading an original document or may be a facsimile job of reading an original document and performing facsimile transmission.

(5) In the foregoing embodiments, the user ID input method is selected by using the PC 2, by way of example. In contrast, an arbitrary input method may be selected when a user inputs a user ID to the printer 1, instead of selecting the user ID input method on the PC 2.

In the above-described embodiments, the controller 10 includes the single CPU 10a. Alternatively, the controller 10 may be constituted by a plurality of CPUs 10a, may be constituted by an ASIC, or may be constituted by a combination of one or more CPU and ASIC. Also, the above-described functions of the controller 10 may be executed by software, hardware, or a combination of software and hardware.

What is claimed is:

1. An image processing apparatus comprising:
   an image processor configured to execute image processing;
   a display unit configured to provide a screen;
   a reader configured to read user information by reading a medium having the user information in a contactless manner or a contact manner;
   an operation unit configured to receive the user information by operation of the operation unit;
   a processor; and
   a memory storing instructions, the instructions, when executed by the processor, causing the processor to perform:
   when at least one of the reader and the operation unit receives the user information, determining an input method from a first input method in which the reader is used exclusively, a second input method in which both the reader and the operation unit are used exclusively, and a third input method in which the operation unit is used exclusively;
   based on the determined input method and a predetermined correspondence relationship, determining a screen providing method from a first screen providing method of providing no input screen for inputting information, a second screen providing method of providing a screen in which a first number of setting items is provided, and a third screen providing method of providing a screen in which a second number of setting items is provided, the second number being larger than the first number, the correspondence relationship being such that the first input method corresponds to the first screen providing method, the second input method corresponds to the second screen providing method, and the third input method corresponds to the third screen providing method; and
   controlling the display unit to provide or not to provide the input screen based on the determined screen providing method.

2. The image processing apparatus according to claim 1, wherein, when the operation unit receives the user information by the third input method, a number of operations is larger than a number of operations when the reader receives the user information by one of the first and second input methods; and
   wherein, when the operation unit receives the user information by the third input method, the controller is configured to determine to provide a user interface in which an image processing condition can be set more specifically than the user interface provided when the reader receives the user information by one of the first and second input methods.

3. The image processing apparatus according to claim 2, wherein the number of operations is a number of operations for inputting the user information.

4. The image processing apparatus according to claim 2, wherein the image processing condition includes at least one setting item relating to image processing.

5. The image processing apparatus according to claim 4, wherein the image processing condition includes setting values of the at least one setting item.

6. The image processing apparatus according to claim 1, wherein the processor is configured to perform:
  determining to provide a particular number of screens when the operation unit receives the user information by the third input method, and determining to provide no screen when the reader reads the user information by the first input method.

7. The image processing apparatus according to claim 1, wherein the first input method is an input method not requiring entering a password after the reader reads the medium, and the second input method is an input method requiring entering the password after the reader reads the medium,
  wherein the processor is configured to perform:
    when the reader reads the user information by the first input method, determining to provide no screen; and
    when the reader reads the user information by the second input method, determining to provide at least one screen.

8. The image processing apparatus according to claim 1, wherein the processor is configured to perform:
  controlling the operation unit to receive, from the user, selection of a particular screen corresponding to at least one of the first to third input methods; and
  controlling the display unit to provide the particular screen corresponding to the selection, when the operation unit receives the user information.

9. The image processing apparatus according to claim 1, wherein the screen includes a screen for designating an image to be processed.

10. The image processing apparatus according to claim 1, wherein the screen includes a screen for setting an image processing condition.

11. The image processing apparatus according to claim 1, wherein the screen includes a first screen for selecting an image which is excluded from a group of images to be processed; and a second screen for changing a processing order of images forming the group of images.

12. The image processing apparatus according to claim 1, wherein a number of screens provided in the third screen providing method is larger than a number of screens provided in the second screen providing method.

13. A non-transitory computer readable medium storing a set of program instructions that, when executed by a processor of an information processing apparatus capable of communicating with an image processing apparatus, cause the information processing apparatus to execute:
  displaying an input-method setting screen that is used by a user to select an input method out of a plurality of input methods for inputting user information to the image processing apparatus; the image processing apparatus having a reader configured to read user information by reading a medium having the user information in a contactless manner or a contact manner, and an operation unit configured to receive the user information by operation of the operation unit,
  the plurality of input methods including a first input method in which the reader is exclusively used, a second input method in which both the reader and the operation unit are exclusively used, and a third input method in which the operation unit is exclusively used,
  a plurality of screen providing methods including a first screen providing method of providing no input screen for inputting information, a second screen providing method of providing a screen in which a first number of setting items is provided, and a third screen providing method of providing a screen in which a second number of setting items is provided, the second number being larger than the first number, a predetermined correspondence relationship being such that the first input method corresponds to the first screen providing method, the second input method corresponds to the second screen providing method, and the third input method corresponds to the third screen providing method;
  receiving the input method selected via the input-method setting screen;
  adding the input method to an image to be processed by the image processing apparatus; and
  transmitting the input method added to the image to the image processing apparatus.

14. The non-transitory computer readable medium according to claim 13, wherein the first input method is an input method not requiring entering a password after the reader reads the medium, and the second input method requiring entering the password after the reader reads the medium.

15. A non-transitory computer readable medium storing a set of program instructions executable on an image processing apparatus having: a display unit configured to read user information by reading a medium having the user information in a contactless manner or a contact manner; and an operation unit configured to receive the user information by operation of the operation unit, the set of program instructions comprising:
  when at least one of the reader and the operation unit receives the user information, determining an input method from a first input method in which the reader is exclusively used, a second input method in which both the reader and the operation unit are exclusively used, and a third input method in which the operation unit is exclusively used;
  based on the determined input method and a predetermined correspondence relationship, determining a screen providing method from a first screen providing method of providing no input screen for inputting information, a second screen providing method of providing a screen in which a first number of setting items is provided, and a third screen providing method of providing a screen in which a second number of setting items is provided, the second number being larger than the first number, the correspondence relationship being such that the first input method corresponds to the first screen providing method, the second input method corresponds to the second screen providing method, and the third input method corresponds to the third screen providing method; and
  controlling the display unit to provide or not to provide the input screen based on the determined screen providing method.

* * * * *